(12) United States Patent
Guy (10) Patent No.: US 7,891,672 B2
(45) Date of Patent: Feb. 22, 2011

(54) CHUCK HAVING A ROTATABLE SECURING MECHANISM

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 911 days.

(21) Appl. No.: 11/767,870

(22) Filed: Jun. 25, 2007

(65) Prior Publication Data

US 2007/0296162 A1 Dec. 27, 2007

(30) Foreign Application Priority Data

Jun. 27, 2006 (IL) .................................. 176592

(51) Int. Cl.
*B23B 31/117* (2006.01)
(52) U.S. Cl. .................. 279/9.1; 279/103; 279/903
(58) Field of Classification Search .............. 279/9.1, 279/102, 103, 903; 409/234; *B23B 31/117*
See application file for complete search history.

(56) References Cited

U.S. PATENT DOCUMENTS

| | | | |
|---|---|---|---|
| 2,039,149 A | 12/1932 | Dodge | |
| 4,379,667 A * | 4/1983 | Yoshimoto et al. ........... | 409/234 |
| 4,630,980 A * | 12/1986 | Kubo ........................... | 409/234 |
| 4,657,454 A * | 4/1987 | Migita et al. ................. | 409/234 |
| 4,721,423 A * | 1/1988 | Kubo ........................... | 409/234 |
| 4,799,838 A * | 1/1989 | Kubo et al. ................... | 409/234 |
| 4,808,049 A | 2/1989 | Cook | |
| 4,865,336 A * | 9/1989 | Keritsis ........................ | 279/9.1 |
| 5,335,922 A * | 8/1994 | Unate .......................... | 279/9.1 |
| 5,577,743 A | 11/1996 | Kanaan et al. | |
| 6,105,974 A * | 8/2000 | Matsumoto .................. | 279/9.1 |
| 6,131,916 A | 10/2000 | Toda | |
| 6,966,730 B1 | 11/2005 | Miyanaga | |
| 7,017,919 B2 * | 3/2006 | Matsumoto et al. .......... | 279/9.1 |
| 2005/0073115 A1 | 4/2005 | Matsumoto et al. | |
| 2010/0270756 A1 * | 10/2010 | Guy ............................. | 279/9.1 |

FOREIGN PATENT DOCUMENTS

| | | | |
|---|---|---|---|
| GB | 921522 | | 2/1961 |
| JP | 63169205 A | * | 7/1988 |
| JP | 63229205 A | * | 9/1988 |
| WO | WO 02057039 A1 | * | 7/2002 |

OTHER PUBLICATIONS

International Search Report, PCT/IL2007/000674, Nov. 13, 2007.

* cited by examiner

*Primary Examiner*—Eric A Gates
(74) *Attorney, Agent, or Firm*—Womble Carlyle (57) ABSTRACT

A chuck for clamping an article has a receiving portion including a receiving bore having a longitudinal axis L, and a receiving bore inner surface. A clamping sleeve is accommodated in the receiving bore and is rotatable between a releasing position and a securing position. The clamping sleeve has a radially outwardly facing contoured clamping surface provided with one on more clamping segments, each clamping segment having a ramp between a trough and a crest, and a depression on the other side of the crest. Rotating the clamping sleeve within the receiving bore causes one or more rollers associated with each clamping segment to cooperate with the contoured clamping surface to effect the releasing and the securing of the article.

20 Claims, 12 Drawing Sheets

CHUCK HAVING A ROTATABLE SECURING MECHANISM

FIELD OF THE INVENTION

The present invention disclosure relates to a chuck, and particularly to chucks used for releasably securing cutting tools or work-pieces to machining tools.

BACKGROUND OF THE INVENTION

Chucks are used to removably secure cutting tools or work-pieces to machining tools, such as metal cutting machines. As is well known in the art, chucks generally have a mounting portion which is adapted to be releasably clamped in the machining tool, and a receiving portion which releasably holds a cutting tool or a work-piece.

U.S. Pat. No. 2,039,149 to Dodge discloses a one way clutch (an over-running, or a free-wheeling clutch) coupling a driving element to a driven element, employing rollers relieved from sliding or rolling loads, having very little backlash which is further cushioned by an oil film. The over-running clutch comprises inner and outer members, a series of wedge blocks each having on one side a cylindrical surface adapted to be forced into frictional engagement with one of said members, and having a wedge surface on its opposite side, a corresponding series of rollers each arranged between the other of said members and the wedge surface of one of said blocks, and means (i.e., springs) for urging said rollers away from said blocks, said means being independent of said blocks.

When the one way clutch is standing without load, all parts (i.e., the coaxial members, the wedge blocks, the rollers and the springs) are held snugly in engagement. However, when an over-running load is applied, the springs are coiled by the drag of the over running load which works directly against the force of the springs, thereby reversing the load applied by the springs at rest, and reducing the spring load, until a balance of forces is achieved. Additionally, when over-running starts, oil is introduced to form an oil film on the one of said members into which the cylindrical surfaces of the wedge are forced, thereby reducing friction loads. The reverse occurs when driving load is applied, i.e., the pressure on the wedge block increases, urging the oil film out through oil grooves formed on the cylindrical surfaces of the wedge blocks, and the wedge blocks frictionally engage the one of said members.

GB Patent No. 921,522 to Hopkins and Cooper discloses a chuck for holding work-pieces, such as circular section bars. The chuck comprises a generally cylindrical tubular member slitted longitudinally to define at least three fingers. A concentric outer sleeve fits over the cylindrical tubular member. The cylindrical tubular member has an eccentric surface formed on an external finger face of each finger. The outer sleeve has radially inwardly protruding cams on an internal sleeve face thereof. When rotating the sleeve relative to the cylindrical tubular member, the cams of the sleeve slide over the eccentric surface of each finger, urging each finger radially inwardly, and thereby exerting gripping forces on a circular section bar accommodated in the cylindrical tubular member.

U.S. Pat. No. 4,808,049 to Cook discloses a chuck for use on a machine tool. The chuck has a slotted-type collet exhibiting a formed external surface comprising a plurality of exterior cam surface segments disposed circumferentially around the slotted collet. Each of the exterior cam surface segments increases nominally uniformly from a lesser to a greater radius relative to the central axis of the chuck and the slotted collet. The slotted collet cooperates with a tightening sleeve of the tool holder having interior cam surface segments complementary in numbers and in contour to the exterior cam surface segments. Selective rotation of the tightening sleeve relative to the slotted collet causes selective engagement of the complementary interior cam surface segments and the exterior cam surface segments, thereby urging the slotted collet to apply gripping force to a shank of a cutting tool.

U.S. Pat. No. 6,131,916 to Toda discloses a chuck comprising a mounting base and an integral shaft protruding from a center of a front surface of the base and having a tapered surface on the outer peripheral surface thereof. A hole having holding portions and pressure portions which are to be pressurized is formed in the protruding shaft. The holding portions and the pressure portions are alternately arranged, and the holding portions are situated at a plurality of positions equally spaced along an inner periphery of the protruding shaft. Each of the holding portions has a short radius from the center of the hole. The portions to be pressurized are situated between the holding portions and have a long radius from the center of the hole. A rotating cylinder is detachably fitted outside the protruding shaft, and a group of rollers are arranged inside the rotating cylinder so that the axis of the group of rollers is aligned along the axis of the rotating cylinder and supported by an appropriate means. As the rotating cylinder is rotated and moved, the pressure portions are pressed and constricted by the rollers which are in peripheral contact with an outer peripheral surface of the protruding shaft. Thus, the holding portions are expanded (released) in the circumferential direction due to the pressing and constriction of the pressure portions. As a result, an irregular shape of the hole is changed into a perfect circle, facilitating insertion of a proximal portion of a tool into the now perfectly-circular hole. Following insertion of the proximal portion of the tool into the chuck, the rotating cylinder is rotated and moved from the long diameter portion to the short diameter portion of the tapered surface of the protruding shaft. Consequently, the group of rollers stops pressurizing the pressure portions. Thus, the holding portions are not expanded. The proximal portion of the tool in the hole is held by the holding portions, which are now restored to the original shape. When the tool is held in the chuck, the rotating cylinder is removed from the protruding shaft. To remove the tool from the protruding shaft, the rotating cylinder is used again to press and constrict the pressure portion in order to expand the holding portions in the circumferential direction. As a result, the irregular shape of the hole in the clamping position is restored into the perfect circle of the released position, facilitating removal of the proximal portion of the tool from the now perfectly-circular hole.

It is an object of the present disclosure to provide an improved chuck. This object is attained with the subject matter in accordance with the claims.

SUMMARY OF THE INVENTION

In one aspect, the present invention is directed to a chuck for releasably securing an article. The chuck comprises a receiving portion, a clamping sleeve and at least one roller. The receiving portion comprises a receiving bore having a longitudinal axis L and a receiving bore surface. The clamping sleeve is accommodated in the receiving bore and is rotatable between a releasing position and a securing position. The clamping sleeve comprises a contoured clamping surface having at least one clamping segment. The clamping segment comprises a first ramp between a trough and a crest, and a second ramp between the crest and a depression, wherein the trough, crest and depression are respectively, at a trough distance $D_T$, a crest distance $D_C$ and a depression distance $D_D$, from the longitudinal axis L, wherein $D_T<D_D<D_C$. The at least one roller is accommodated between the receiving bore surface and the contoured clamping surface. When the clamping sleeve is in the securing position, a first roller of said one or more rollers is accommodated in the depression, and at least one of said one or more rollers applies a radially inwardly directed force against the contoured clamping surface. When the clamping sleeve is in the releasing position, said first roller is not accommodated in the depression.

Generally, when the clamping sleeve is in the releasing position, the first roller is adjacent the trough.

Further generally, when the clamping sleeve is rotated from the releasing position to the securing position, the first roller rides along the first ramp, passes over the crest and enters the depression.

In accordance with a preferred embodiment, the receiving bore and the clamping sleeve are both cylindrical.

Preferably, at least one of said one or more rollers applies a radially outward directed force against the receiving bore.

In accordance with a preferred embodiment, the chuck comprises a cylindrical roller cage positioned between the receiving bore surface and the clamping sleeve, the cylindrical roller cage having at least one through-slot, the one or more rollers being accommodated in said through-slot.

In accordance with some specific applications, the article is a rotary machine tool.

BRIEF DESCRIPTION OF THE DRAWINGS

For a better understanding of the present invention and to show how the same may be carried out in practice, reference will now be made to the accompanying drawings, in which.

DETAILED DESCRIPTION OF EXEMPLAR EMBODIMENTS

Attention is drawn to FIGS. 1 to 5. In accordance with a first embodiment, a chuck 30 releasably secures a tool shank 32 of a cutting tool in an integrally-formed chuck receiving portion 34 thereof. The cutting tool may be a rotary cutting tool, such as an end mill, though the shank may belong to some other type of tool, or even be a work piece.

The chuck 30 has a longitudinal axis L defining a front-to-rear direction, and also has an integrally-formed rear mounting portion 36 which is releasably mountable in a rotary machining tool (not shown). The mounting portion extends forwardly to an integrally formed mounting flange 38, with the chuck receiving portion 34 extending forwardly from the mounting flange 38 to a receiving front face 40 which is perpendicular to the longitudinal axis L. The exact shape and operation of the mounting portion 36 and the mounting flange 38 are generally known to those skilled in the art.

A receiving bore 42 having a cylindrical receiving surface 44 extends coaxially with the longitudinal axis L rearwardly from the receiving front face 40 to terminate in a bore rear end 46. The receiving bore 42 accommodates a clamping mechanism 48 having a clamping sleeve 50 and a plurality of rollers 52 accommodated in a cylindrical roller cage 54. The plurality of rollers 52 and the cage 54 are disposed between the clamping sleeve 50 and the receiving surface 44 of the bore 42.

Figure 6:
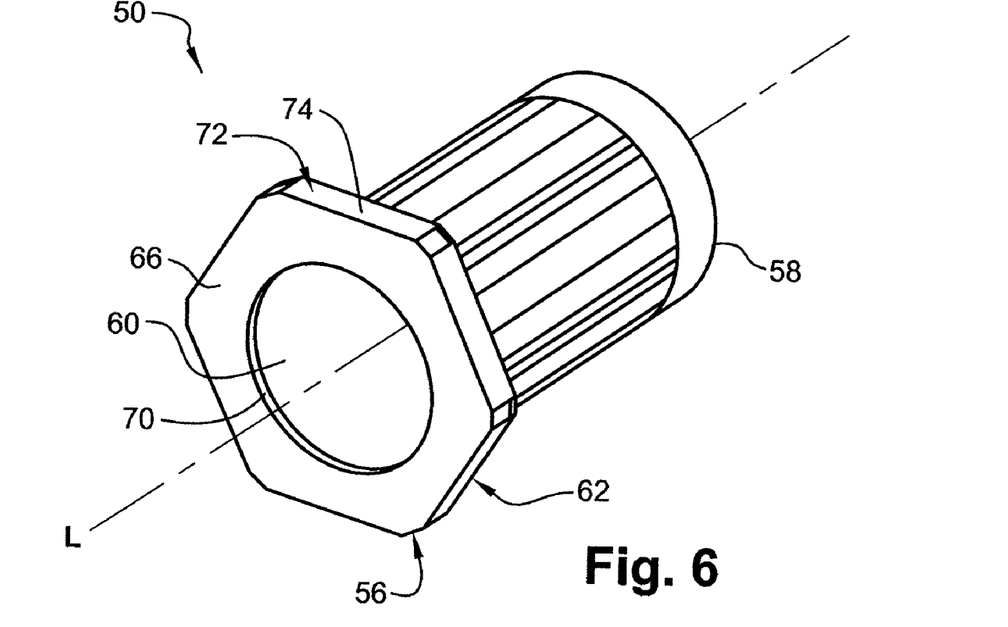
FIG. 6 shows a front perspective view of a clamping sleeve of the clamping mechanism shown in FIG. 5.
Figure 7:
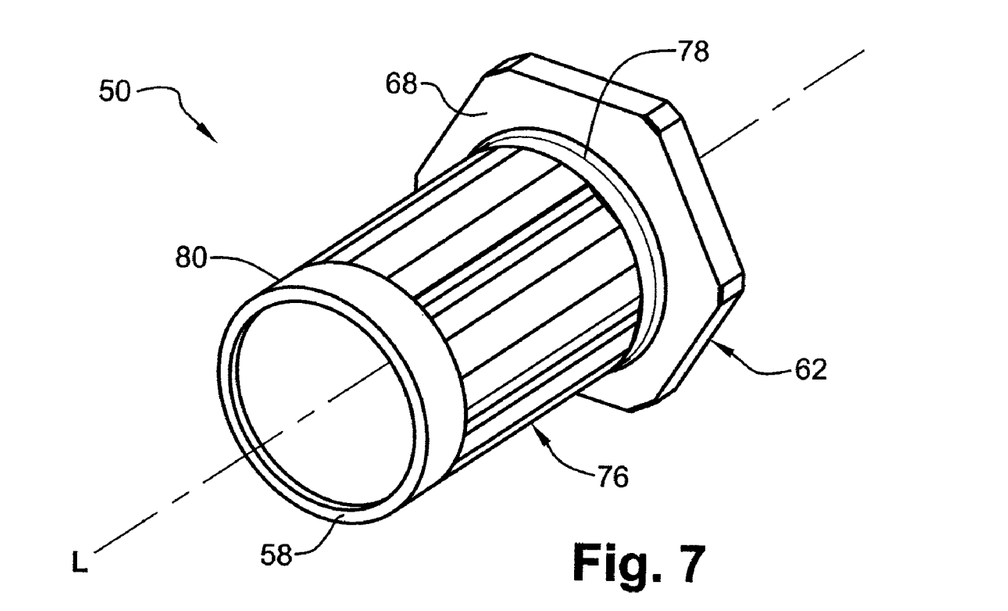
FIG. 7 shows a rear perspective view of the clamping sleeve shown in FIG. 6.

Attention is now drawn to FIGS. 6 and 7. The clamping sleeve 50 is preferably constructed from a single piece of a hard and resilient material, and is preferably manufactured by conventional metal cutting operations. The clamping sleeve 50 extends from a sleeve front end 56 to a sleeve rear end 58 parallel to the longitudinal axis L. A clamping through-hole 60 in which the tool shank 32 is received extends through the clamping sleeve 50 from the sleeve front end 56 to the sleeve rear end 58 coaxially with the longitudinal axis L. The sleeve front end 56 constitutes a sleeve head 62 which protrudes radially outwardly relative to a generally cylindrical sleeve body 64 extending longitudinally rearwardly therefrom to the sleeve rear end 58 coaxially with the longitudinal axis L. The sleeve head 62 may preferably be of a hexagonal-head design having a hexagonal head front face 66 and a parallel and opposing hexagonal head rear face 68, both the front and rear head faces 66, 68 being perpendicular to the longitudinal axis L. The clamping through-hole 60 meets the head front face 66 at a sleeve bore bevel 70. A head peripheral envelope 72 having six flat head bearing surfaces 74 extends between the head front and rear faces 66, 68 parallel to the longitudinal axis L. The sleeve head 62 is designed to be driven by a correspondingly-shaped wrench (not shown). While in the embodiment shown, a hexagonal head 62 is employed, it is understood that some other shaped head (and a suitable tool therefor) may be used instead.

The sleeve body 64 has a contoured clamping surface 76 which meets the head rear face 68 at a circumferential channel 78 and extends rearwardly therefrom parallel to the longitudinal axis L to a cylindrical sleeve rear surface 80 extending rearwardly from the contoured clamping surface 76 to terminate at the sleeve rear end 58.

Figure 8:
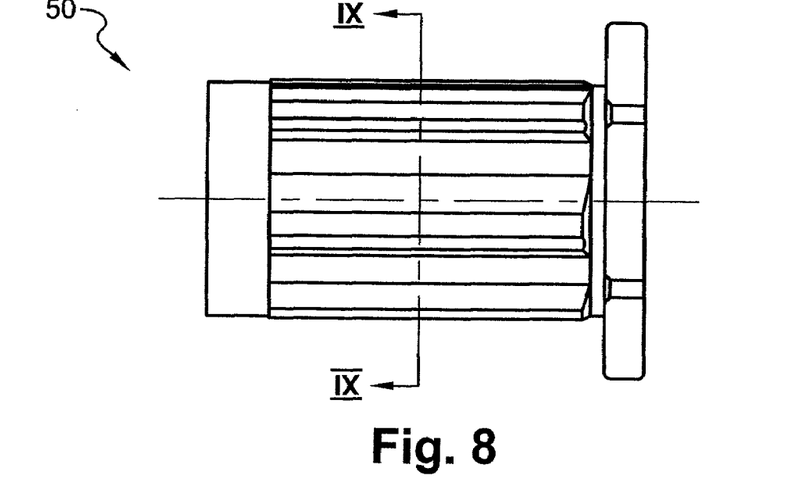
FIG. 8 shows a side view of the clamping sleeve shown in FIG. 5.
Figure 9:
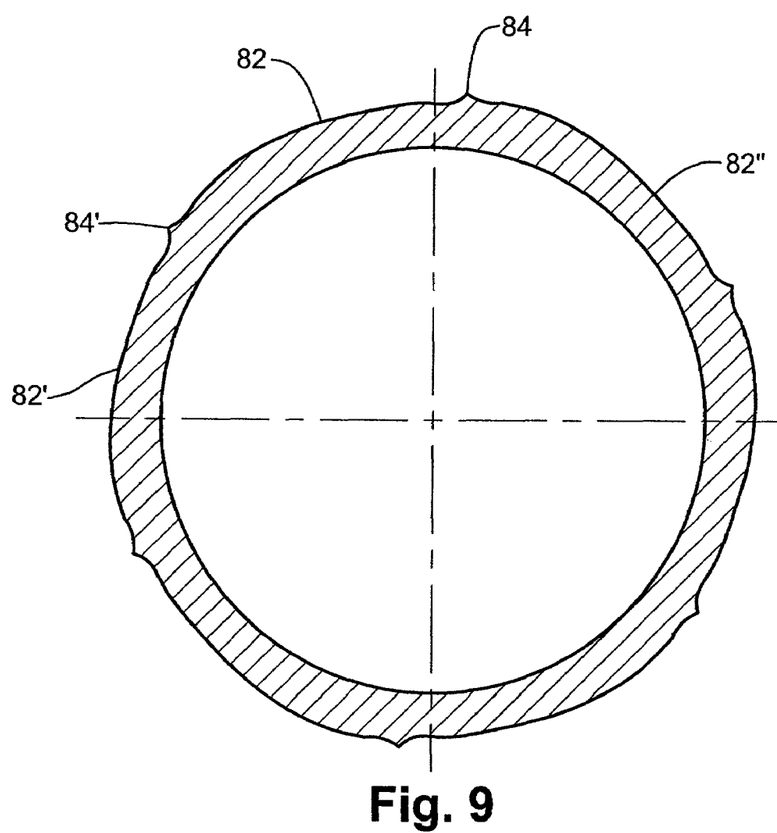
FIG. 9 shows a cross-section of the clamping sleeve shown in FIG. 5, taken along the line IX-IX in FIG. 8.

Attention is now drawn to FIGS. 8 and 9. The contoured clamping surface 76 has a plurality of successive identical clamping segments 82 formed thereon. Each clamping segment 82 extends longitudinally along the contoured clamping surface 76 parallel to the longitudinal axis L and circumferentially between a preceding clamping segment 82' and a succeeding clamping segment 82". Each clamping segment 82 is flanked by a first stop ridge 84 and a second stop ridge 84'. In one embodiment, the contoured clamping surface 76 has six identical clamping segments 82. Because the clamping segments 82 are identical, only one will be described in detail. It is also understood here that even though the term 'segment' is used, the contoured clamping surface 76 most often will have unitary construction and comprise a single continuous surface.

Figure 10:
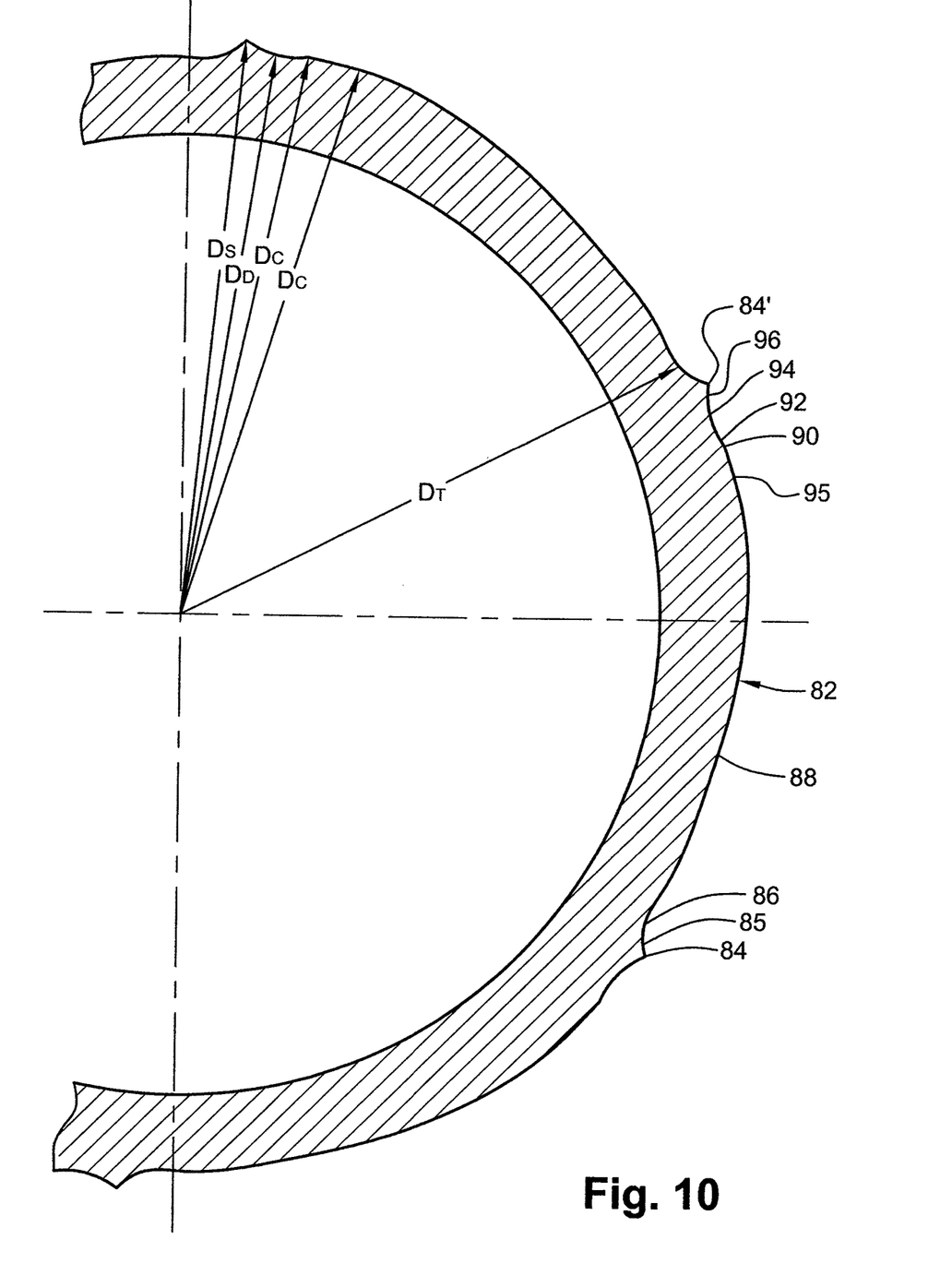
FIG. 10 shows a detail view of the cross-section of the clamping sleeve shown in FIG. 9.

As best seen in FIG. 10, the clamping segment 82 extends between adjacent stop ridges 84, 84'. A first shoulder 85 slopes in a radially inward direction from a first stop ridge 84 to a trough 86. A first ramp 88 extends from the trough 86 to a crest 90. As seen in the embodiment of FIG. 10, the first ramp 88 may extend for over one-half the circumferential length of the segment 82, with a gradual, radially outwardly directed incline. In some embodiments, the terminal portion of the first ramp 88, proximate the crest 90, is in the form of a plateau 95 having a reduced incline relative to the remainder of the first ramp 88. From the crest 90, a second ramp 92 extends to a depression 94. From the depression 94, a third ramp 96 extends to the second, adjacent stop ridge 84'. This sequence of features is then repeated for each segment around the circumference of the clamping surface 76, it being understood that each of these features extends longitudinally therealong.

From the above, it can be seen that the trough 86 is between the stop ridge 84 and the first ramp 88; the first ramp 88 is between trough 86 and the crest 90; and the depression 94 is formed on a far side of the crest 90. The trough 86, crest 90, depression 94 and the stop ridge 84 are located at a trough distance $D_T$, a crest distance $D_C$, a depression distance $D_D$ and a stop ridge distance $D_S$, respectively, from the longitudinal axis L, with the trough distance $D_T$ being smaller than the depression distance $D_D$, and the depression distance $D_D$ being smaller than the crest distance $D_C$. The stop ridge distance $D_S$ may be either equal to or larger than the crest distance $D_C$. Thus, $D_T < D_D < D_C \leqq D_S$.

Figure 4:
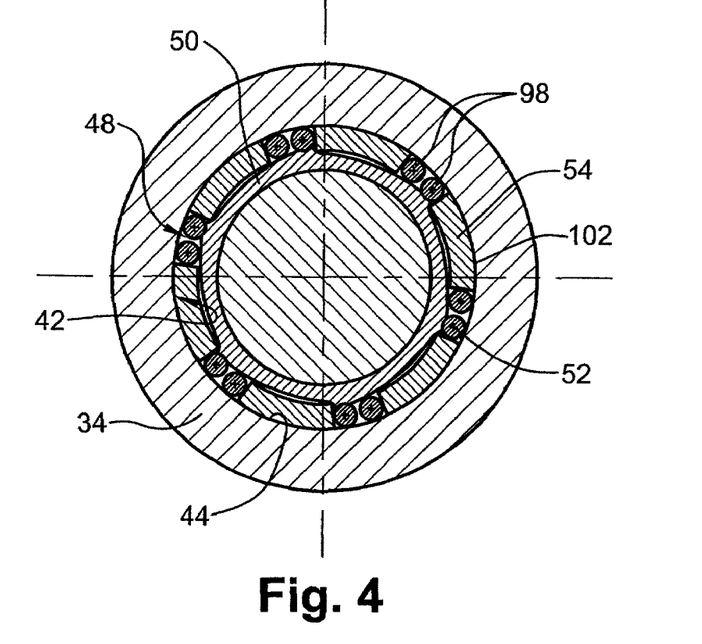
FIG. 4 shows a section view of the chuck and the cutting tool shown in FIG. 2 along section line IV-IV.
Figure 5:
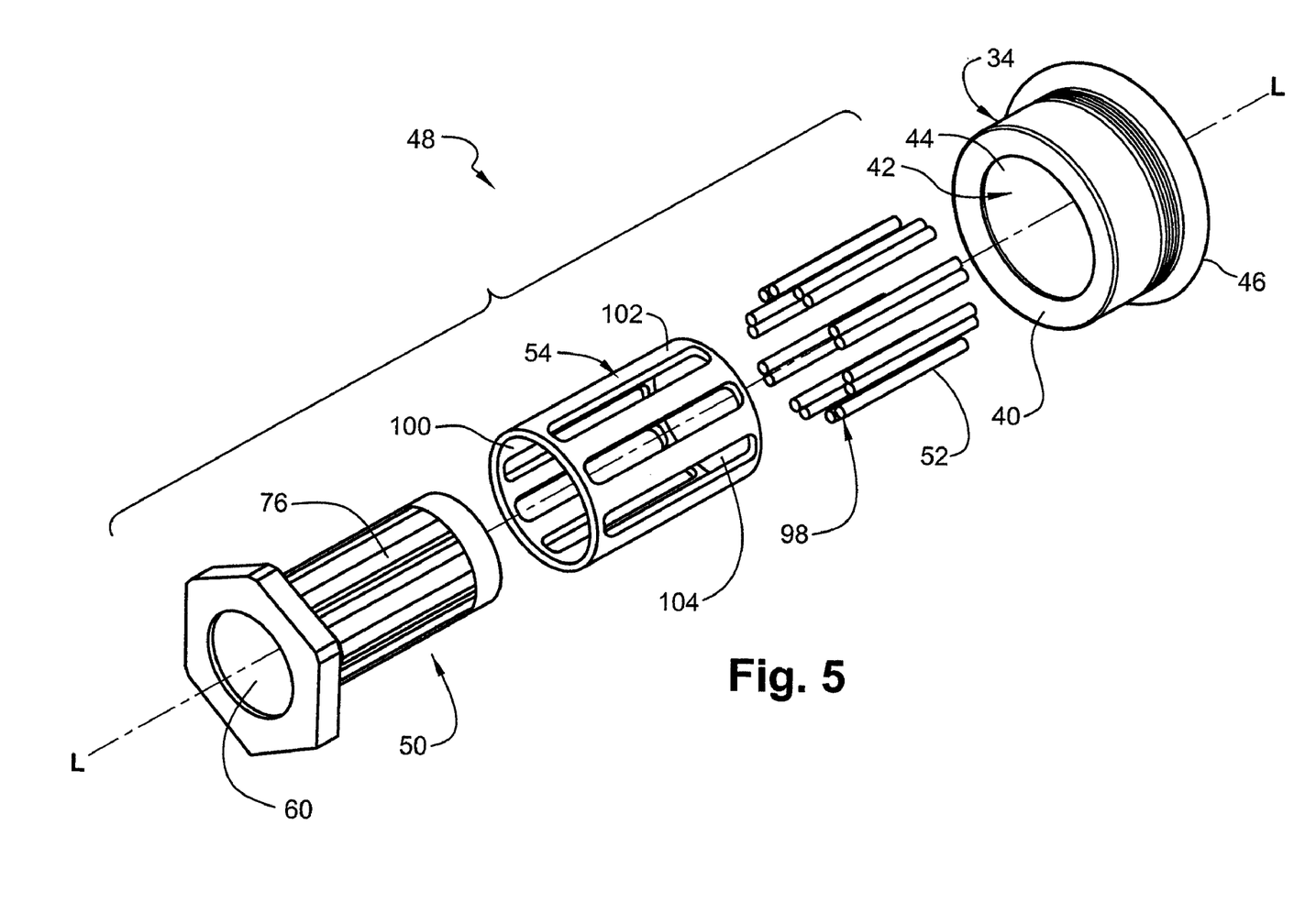
FIG. 5 shows an exploded perspective view of a clamping mechanism of the chuck shown in FIG. 1.

In accordance with some preferred embodiments, and as shown in FIGS. 4 and 5, each clamping segment 82 is associated with a roller pair 98. The two rollers 52 of the roller pair 98 may be identical. Accordingly, the clamping mechanism 48 in this embodiment has six roller pairs 98.

Each roller 52 is of a solid, unitary construction, and is preferably formed of a hard and resilient material. Each roller 52 has a cylindrical shape extending longitudinally along a central longitudinal roller axis R. The roller pairs 98 are kept separated from each other by the roller cage 54. The roller cage 54 is of a generally cylindrical shape extending coaxially with the longitudinal axis L and having a cage inner surface 100 and a cage outer surface 102. Six identical spaced-apart longitudinal cage through-slots 104 extend radially between the cage inner surface 100 and the cage outer surface 102 and axially parallel to the longitudinal axis L. Each of the six roller pairs 98 is received in one of the six cage through-slots 104, thereby keeping each roller pair separated from adjacent roller pairs 98. The cage through-slots 104 align the rollers 52 so that the longitudinal roller axis R of each roller 52 is parallel to the longitudinal axis L of the chuck 30.

Figure 1:
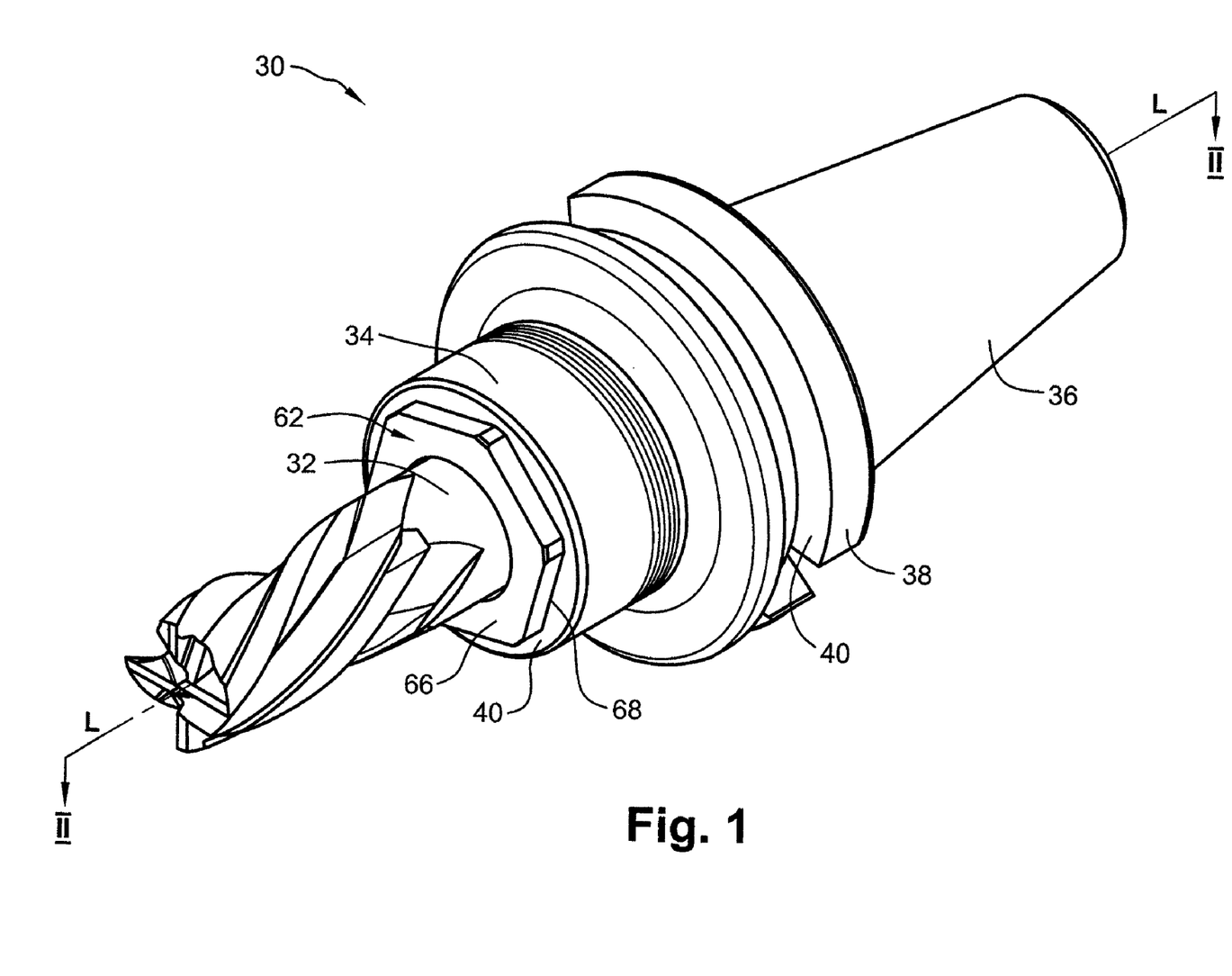
FIG. 1 shows a perspective view of a chuck and a cutting tool secured therein in accordance with one embodiment of the present invention.
Figure 2:
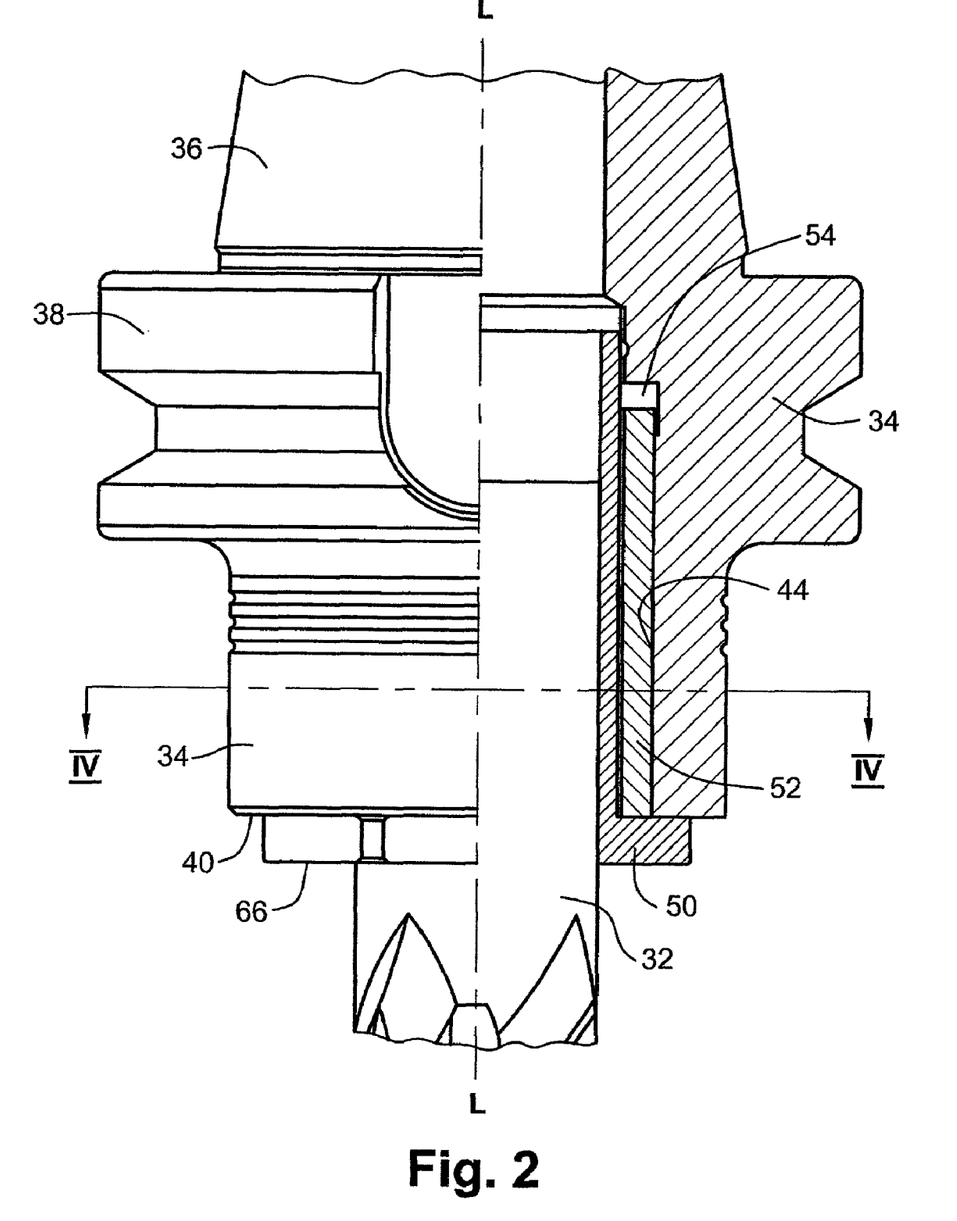
FIG. 2 shows a side view, partially in section, of the chuck shown in FIG. 1.
Figure 3:
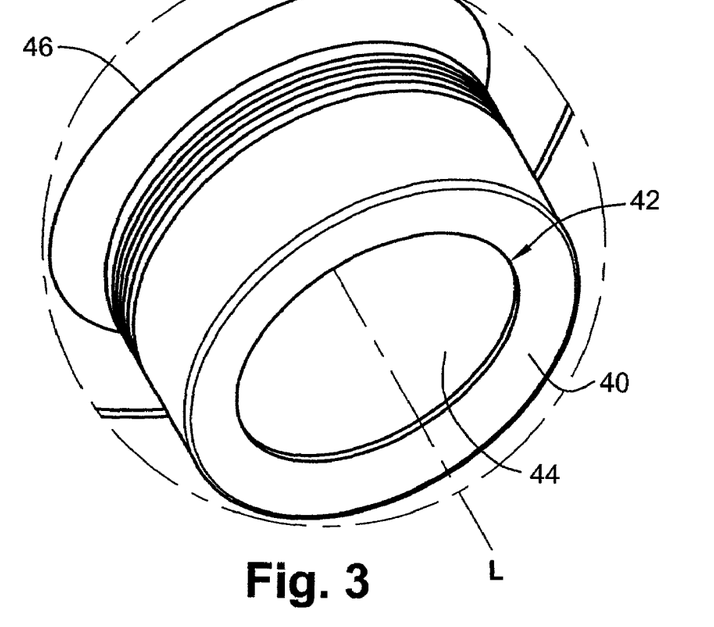
FIG. 3 shows a perspective front view of the chuck receiving portion seen in FIG. 1.

As is best shown in FIGS. 1 and 2, the clamping mechanism 48 is accommodated in the receiving portion 34 with the sleeve body 64 positioned in the receiving bore 42 coaxially with the longitudinal axis L, and with the sleeve head 62 protruding forwardly relative from the receiving portion 34 so that the head rear face 68 is adjacent the receiving front face 40. As is best shown in FIG. 4, when the clamping mechanism 48 is in the receiving bore 42, the roller pair 98 associated with each clamping segment 82 is pressed between the clamping segment 82 and the receiving surface 44, with the cage inner surface 100 facing the contoured clamping surface 76 of the clamping sleeve 50 and the cage outer surface 102 facing the receiving surface 44 of the receiving bore 42.

In order to secure the tool shank 32 in the chuck 30, or to release the tool shank 32 therefrom, the clamping mechanism 48 is rotatable, relative to the receiving portion 34, between a releasing position and a securing position. Rotating the clamping mechanism 48 from the releasing position to the securing position, and vice versa, may be accomplished by applying a wrench (not shown) to turn the sleeve head 62 of the clamping sleeve 50.

Figure 11:
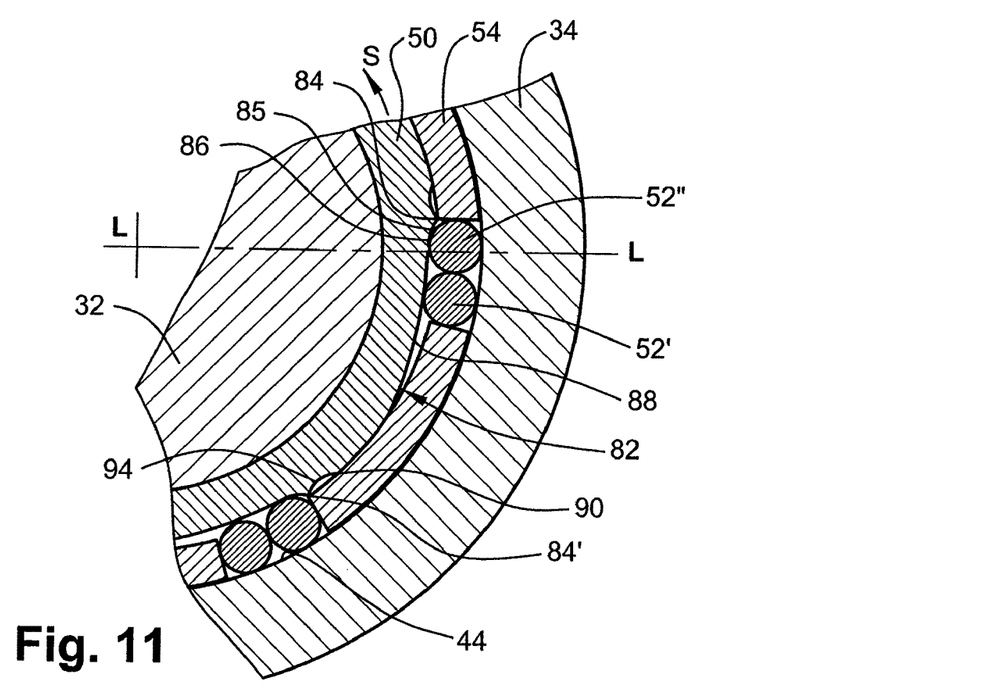
FIG. 11 shows a detail view of the chuck shown in FIG. 4, in a releasing position.

In the releasing position, as best seen in FIG. 11, each roller pair 98 is located on the trough-side of the first ramp 88. The roller pair 98 includes a lead, or first, roller 52' and a second roller 52" adjacent to the first roller 52'. The second roller 52" of each roller pair 98 is positioned at the trough 86 immediately adjacent the shoulder 85 of the stop ridge 84, while the first roller 52' of the roller pair 98 is located on the other side of the second roller 52" from the stop ridge 84. Thus, as seen in FIG. 11, the first roller 52' may be at least partially positioned on the first ramp 88 adjacent the trough 86. The clamping through-hole 60 of the clamping sleeve 50 is sized so that in the releasing position, the tool shank 32 can be freely inserted thereto or removed therefrom.

Rotating the clamping sleeve 50 towards the securing position causes the clamping segment 82 to move relative to the roller pair 98. In particular, when moving from the releasing position of FIG. 11 to the securing position of FIG. 12, the clamping segment 82 moves in the direction of the Arrow S. As a consequence, the roller pair 98 effectively rides along the first ramp 88 in a direction from the trough 86 to the crest 90. In the securing position of FIG. 12, the first roller 52' of each roller pair 98 has traversed the crest 90, and is accommodated in the depression 94, between the crest 90 and the adjacent stop ridge 84', while the second roller 52" of the roller pair 98 remains on the crest 90. Because the depression distance $D_D$ and the crest distance $D_C$ are greater than the trough distance $D_T$, rotating the clamping mechanism 48 into the securing position causes the rollers 52 to urge the clamping segments 82 radially inwardly, causing the sleeve body 64 to contract and the clamping through-hole 60 to shrink, thereby securing the tool shank 32 therein.

Figure 12:
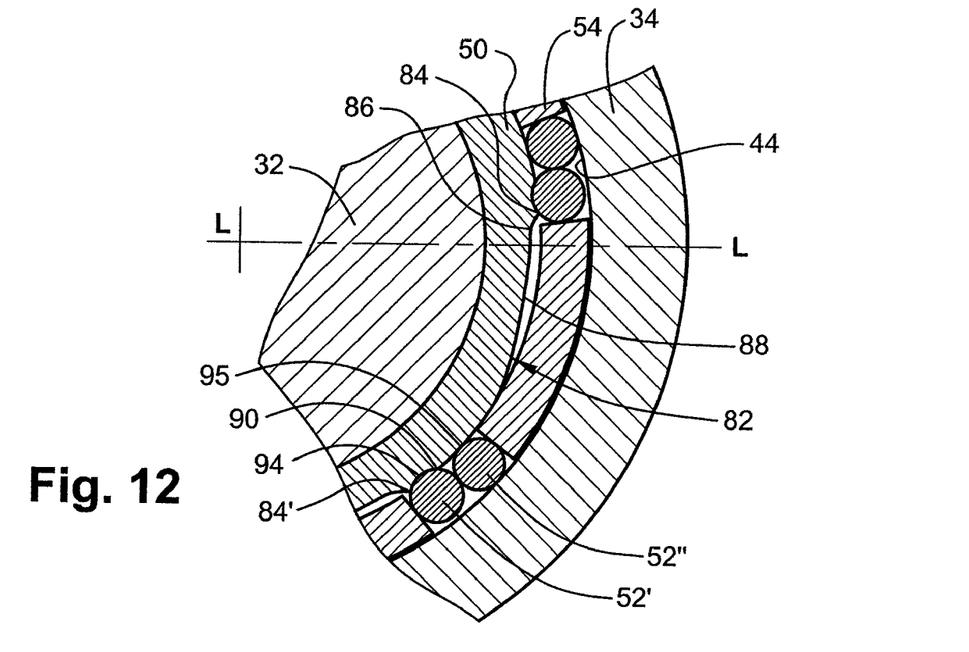
FIG. 12 shows a detail view of the chuck shown in FIG. 4, in a securing position.

When the clamping sleeve 50 is in the securing position of FIG. 12, since the first roller 52' is accommodated in the depression 94, it is slightly radially inward relative to the second roller 52". Thus, the first roller 52' may be somewhat loosely retained between the depression 94 and the receiving surface 44, and so may not apply a clamping force at all—it's purpose being to lock the clamping sleeve in the securing position by virtue of occupying the depression 94. It is the second roller 52" that applies a radially inwardly directed force against a plateau portion 95 of the contoured surface of the clamping segment 82, and in a radially outward direction against the receiving surface of the receiving portion 34. Thus, in the embodiment of FIG. 12, while the second roller 52" applies a compressive force to contract the clamping sleeve 50 radially inwardly to frictionally grab the tool shank 32 and applies a radially outward force to secure the clamping mechanism 48 in the receiving portion 34, the first roller 52' ensures that the clamping mechanism 48 remains in the securing position, absent a sufficient rotational force to dislodge it from the depression 94.

In other possible embodiments of the disclosure, different chucks may have different clamping mechanisms with fewer clamping segments 82 for example 2, 3, 4, or 5 or with more clamping segments 82 for example 7, 8, 9, 10 or more and accordingly with fewer roller pairs 98 for example 2, 3, 4, or 5 or with more roller pairs 98 for example 7, 8, 9, 10 or more.

Figure 13:
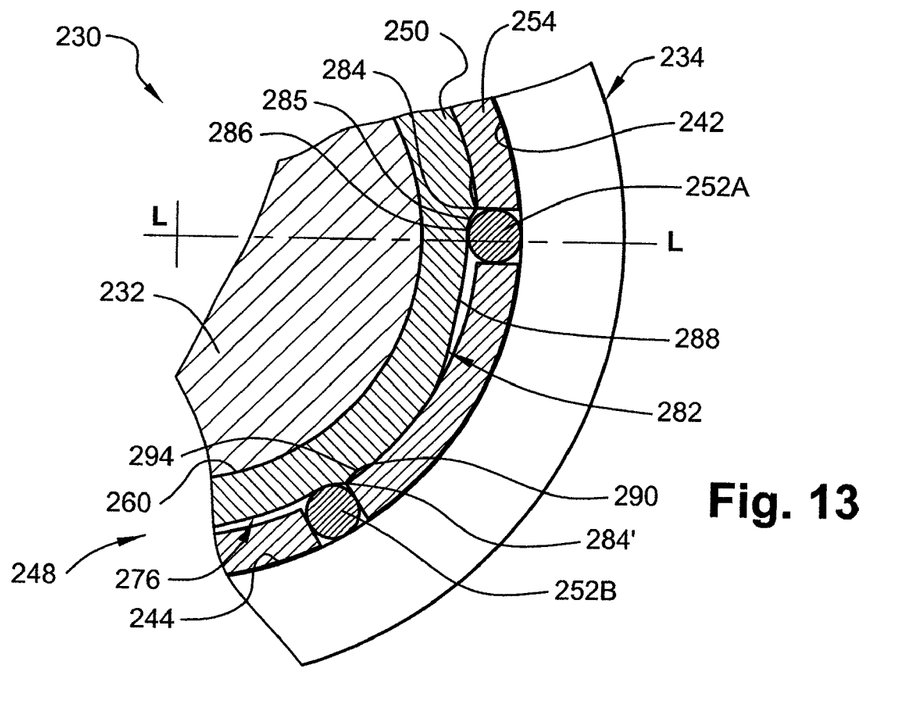
FIG. 13 shows a detail cross-section of another embodiment of the chuck in accordance with the present invention, in a releasing position.
Figure 14:
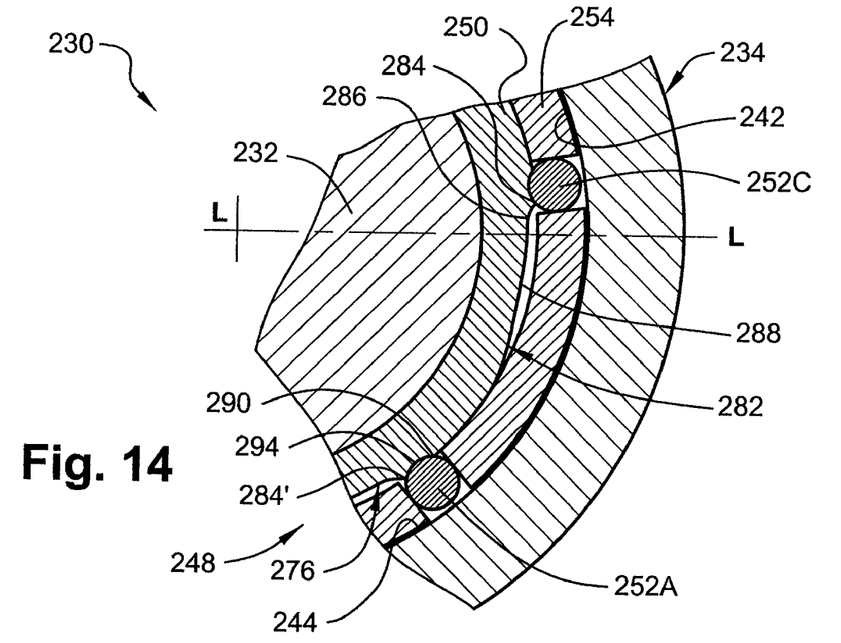
FIG. 14 shows a detail cross-section of the embodiment shown in FIG. 13, in a securing position.

Attention is now directed to FIGS. 13 and 14 showing a releasing position and a clamping position, respectively, of a chuck 230 in accordance with a second embodiment of the present invention. In this second embodiment, exactly one roller, that is, only a single roller is associated with each clamping segment. Since the chuck 230 has many features which are similar to those of the chuck 30, the similar features of the chuck 230 will be referred to herein below by reference numerals which are shifted by 200 from those of the chuck 30.

The chuck 230 has a longitudinal axis L defined much in the same manner as the longitudinal axis L of the chuck 30. A receiving portion 234 of the chuck 230 has a receiving bore 242 extending coaxially with the longitudinal axis L. The receiving bore 242 accommodates a clamping mechanism 248 having a clamping sleeve 250 and a roller cage 254. The clamping sleeve 250 has a clamping through-hole 260 formed therein and extending longitudinally coaxially with the longitudinal axis L, and a contoured clamping surface 276 having a plurality of clamping segments 282 formed thereon. In accordance with one variation of this embodiment, the contoured clamping surface 276 has six identical clamping segments 282.

The clamping through-hole 260 has a tool shank 232 received therein. A plurality of rollers are accommodated at spaced apart intervals between the contoured clamping surface 276 and a receiving surface 244 of the receiving bore 242. However, chuck 230 has a single roller 252A, 252B, 252C, etc. associated with each clamping segment 282 while chuck 30 has a roller pair 98 of identical first and second rollers 52', 52" associated with each clamping segment 82. Accordingly the clamping mechanism 248 in this second embodiment, as presented in FIGS. 13 and 14, has a total of six such rollers.

In a releasing position of the chuck 230, shown in FIG. 13, the roller 252A associated with the clamping segment 282 is located at a trough 286 of the clamping segment 282, facilitating free insertion, positioning, or removal of the tool shank 232 relative to the clamping through-bore 260. Rotating the clamping sleeve 250 towards a securing position causes the roller 252A associated with the clamping segment 282 to move relative to the sleeve body 264 on a first ramp 288 to a crest 290 of the clamping segment 282. In the securing position, as is best shown in FIG. 14, the roller 252A has traversed the crest 290, and is accommodated in a depression 294 disposed between the crest 290 and an adjacent stop ridge 284', thereby causing the sleeve body 264 to contract, and the clamping through-hole 260 to shrink and securely clamp the tool shank 232.

In this 'single roller' embodiment, the roller 252A, when accommodated in the depression 294 with the clamping sleeve 250 in the securing position of FIG. 14, pushes in a radially inward direction against the bottom of the depression 294 and also pushes in a radially outward direction against the receiving surface 244. The roller 252A, by virtue of occupying the depression 294, also helps keep the clamping sleeve 250 in the securing position. Thus, in this embodiment, the roller 252A performs the functions of both first roller 52' and second roller 52" in the 'roller pair' embodiment discussed above with respect to FIGS. 11 and 12.

In other possible embodiments of the disclosure, different chucks may have different clamping mechanisms with fewer clamping segments 282 for example 2, 3, 4, or 5 or with more clamping segments 282 for example 7, 8, 9, 10 or more and accordingly with fewer rollers 252 for example 2, 3, 4, or 5 or with more rollers 252 for example 7, 8, 9, 10 or more.

Figures 15, 16:
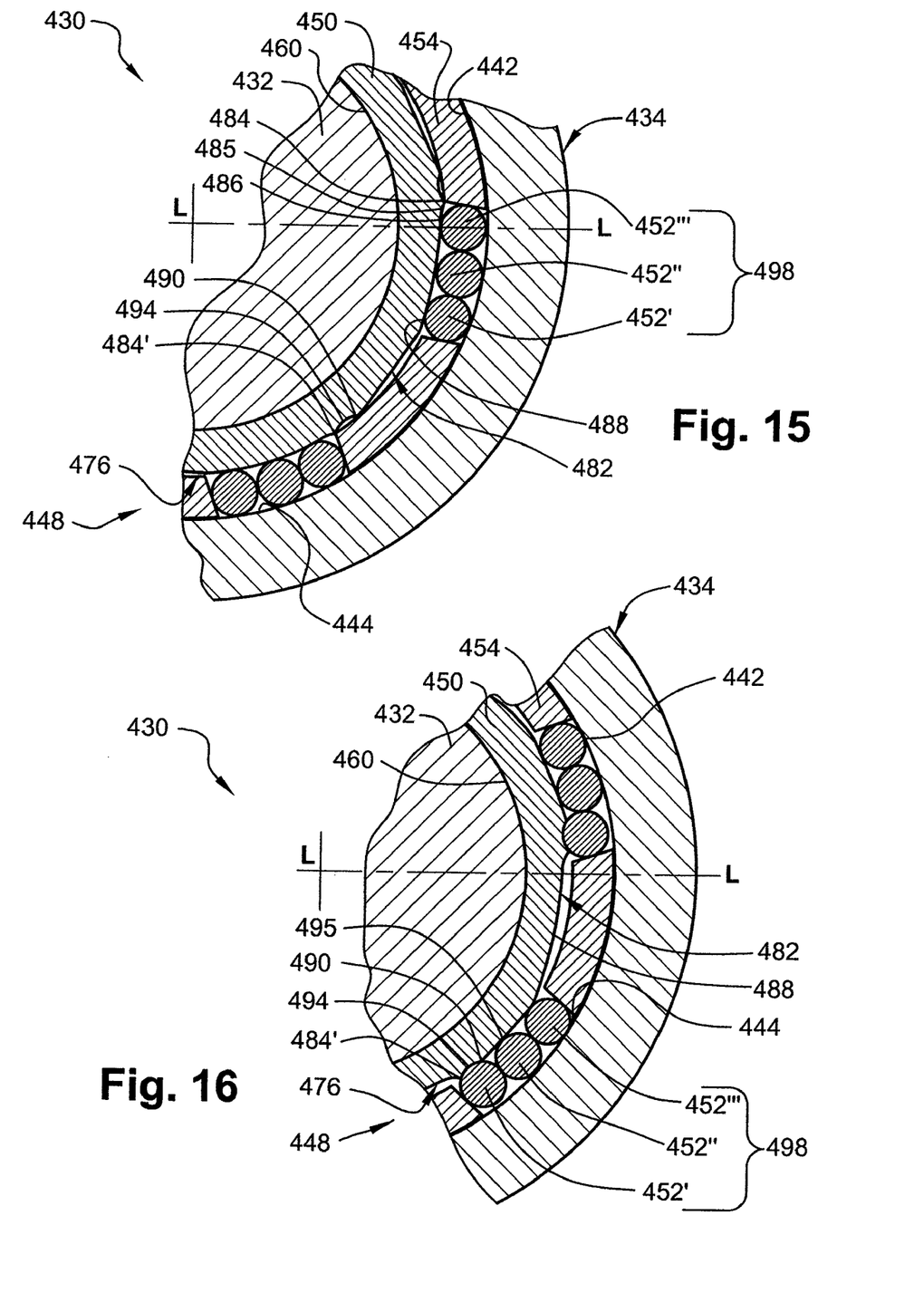
FIG. 15 shows a detail cross-section of still another embodiment of the chuck in accordance with the present invention, in a releasing position.
FIG. 16 shows a detail cross-section of the embodiment shown in FIG. 15, in a securing position.

Attention is now directed to FIGS. 15 and 16 showing a releasing position and a clamping position, respectively, of a chuck 430 in accordance with yet another embodiment of the present invention. Since the chuck 430 has many features which are similar to those of the chuck 30, the similar features of the chuck 430 will be referred to herein below by reference numerals which are shifted by 400 from those of the chuck 30.

The chuck 430 has a longitudinal axis L defined much in the same manner as the longitudinal axis L of the chuck 30. A receiving portion 434 of the chuck 430 has a receiving bore 442 extending coaxially with the longitudinal axis L. The receiving bore 442 accommodates a clamping mechanism 448 having a clamping sleeve 450. The clamping sleeve 450 has a clamping through-hole 460 formed therein and extending longitudinally coaxially with the longitudinal axis L, and a contoured clamping surface 476 having a plurality of clamping segments 482 formed thereon. In accordance with one variation of this embodiment, the contoured clamping surface 476 has six identical clamping segments 482. The clamping through-hole 460 has a tool shank 432 received therein. A plurality of rollers 452 is accommodated between the contoured clamping surface 476 and a receiving surface 444 of the receiving bore 442. In a specific embodiment, three rollers, first, second and third rollers 452', 452", 452''' arranged in a roller trio 498 are associated with each clamping segment 482 of the clamping sleeve 450 while chuck 30 has only two 52', 52" arranged in a roller pair 98 associated with each clamping segment 82. Accordingly the clamping mechanism 448 in this embodiment has six roller trios 498. The three rollers 452', 452", 452''' associated with each clamping segment 482 may be identical.

In a releasing position of the chuck 430, shown in FIG. 15, the roller trio 498 associated with the clamping segment 482 is located on the trough-side of the first ramp 488, A third roller 452''' is positioned at the trough 486 immediately adjacent the shoulder 485 of the ridge stop 484 (see FIG. 15), while the second and first rollers 452", 452', respectively, are located adjacent the third roller 452'''. Thus, the second and first rollers 452", 452' may be at least partially positioned on the first ramp 488 adjacent the trough 486. The first ramp 488 extends from the trough 486 to a crest 490, thus facilitating free insertion, positioning, or removal of the tool shank 432, when in the releasing position.

In the securing position, as is best shown in FIG. 16, the first roller 452' has traversed the crest 490, and is accommodated in a depression 494 disposed between the crest 490 and an adjacent stop ridge 484', while the third and second rollers 452''', 452" are located on the plateau portion 495 of the contoured surface of the clamping segment 482, adjacent the crest 490 of the clamping segment 482. Thus, in this 'roller trio' embodiment, the first roller 452', when accommodated in the depression 494, locks the clamping sleeve 450 in place. Meanwhile, the second roller 452" and third roller 452''' apply the necessary radial forces to cause the clamping sleeve 450 to contract and secure a tool shank 432 accommodated in a clamping through-hole 460 formed in the clamping sleeve 450, and help securing the clamping sleeve 450 in the receiving bore 442.

In other possible embodiments of the disclosure, different chucks may have different clamping mechanisms with fewer clamping segments 476 for example 2, 3, 4, or 5 or with more clamping segments 476 for example 7, 8, 9, 10 or more and accordingly with fewer roller trios 448 for example 2, 3, 4, or 5 or with more roller trios 448 for example 7, 8, 9, 10 or more.

It can be seen from the foregoing description that a clamping segment has one or more rollers associated therewith. When the clamping sleeve is in the securing position, a first roller of the one or more rollers is accommodated in the depression and helps lock the clamping sleeve in the securing position. In the embodiments described above, the remaining rollers, if present, are adjacent the depression and help apply the necessary radial forces to secure the tool shank and also maintain the clamping sleeve in the retaining bore (the sole roller also providing this function in the 'single roller' embodiment). When the clamping sleeve is in the releasing position, the first roller is not in the depression. Finally, as the clamping sleeve rotates from the releasing position to the securing position, the first roller rides along the ramp, passes over the crest and enters the depression.

Figure 17:
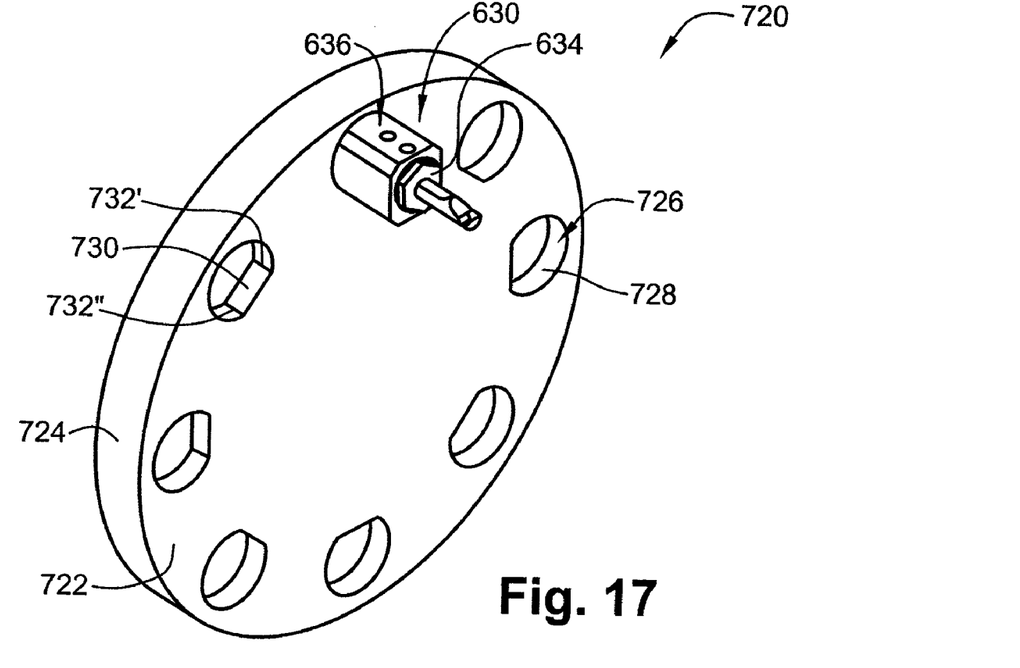
FIG. 17 shows a perspective view of a turret and a cutting tool secured therein in accordance with yet another embodiment of the present invention.
Figure 18:
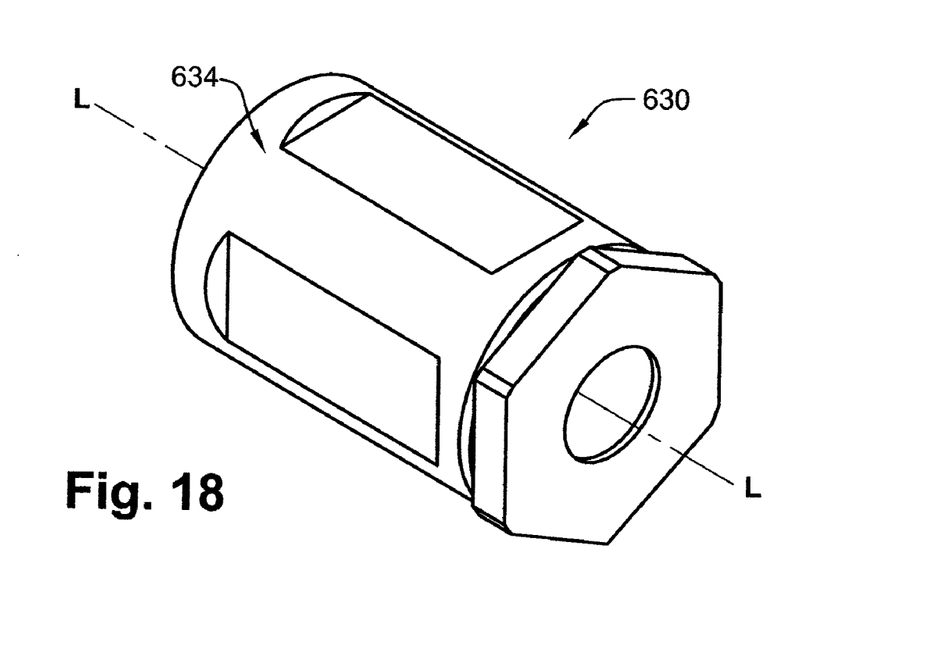
FIG. 18 shows a perspective view of a chuck used to secure the cutting tool shown in FIG. 17.
Figure 19:
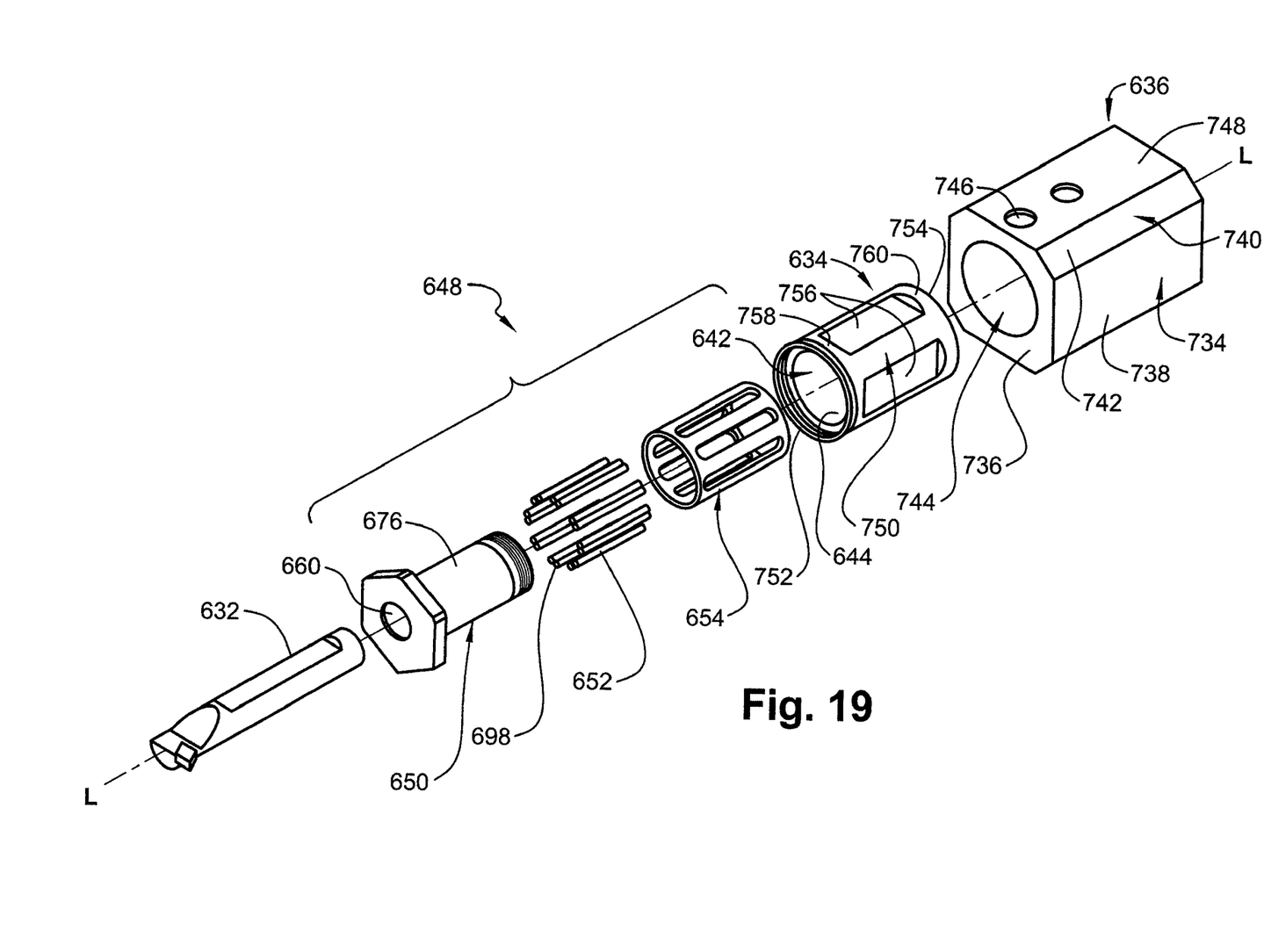
FIG. 19 shows an exploded perspective view of the chuck shown in FIG. 18.

Attention is directed to FIGS. 17 to 19 showing a chuck 630. Since the chuck 630 has many features which are similar to those of the chuck 30, the similar features of the chuck 630 will be referred to herein below by reference numerals which are shifted by 600 from those of the chuck 30.

The chuck 630 has a longitudinal axis L defined much in the same manner as the longitudinal axis L of the chuck 30, and is adapted to releasably secure a tool shank of a stationary cutting tool in a receiving portion 634. The stationary cutting tool may, for example, be a turning tool, though other tools are also contemplated. The receiving portion 634 is accommodated in a mounting portion 636 which may be releasably mountable in a turret 720 of a machine tool, such as a lathe. The turret 720 is of a generally flat-disk shape having parallel and opposing, generally circular, turret front face 722 and turret rear face (hidden in FIG. 17), and a cylindrical turret peripheral surface 724 extending therebetween as shown in FIG. 17. A plurality of chuck holders 726 is disposed in an array in the turret 720, adjacent the turret peripheral surface 724. Each chuck holder 726 retaining a chuck. The plurality of chuck holders 726 may be disposed in a circular array. Each chuck holder 726 is configured to receive and hold the mounting portion 636 of the chuck 630. The chuck holder 726 is of a generally truncated cylindrical bore shape, having a holder cylindrical wall 728 extending from the turret front face 722 to the turret rear face. The holder cylindrical wall 728 is truncated by a planar chuck support 730 defining first and second holder wall ends 732', 732" so that the holder cylindrical wall 728 extends circumferentially from the first holder wall end 732' to the second holder wall end 732" along an holder arc angle θ greater than 180°. The planar chuck support 730 extends from the second holder wall end 732" to the first holder wall end 732' of the chuck holder 726. The planar chuck support 730 is adapted to prevent the mounting portion 636 held in the chuck holder 726 from rotating relative thereto.

As shown in FIG. 19, the mounting portion 636 is of an elongated prism shape having a mounting envelope 734 extending longitudinally between opposing and parallel mounting front face 736 and mounting rear face (hidden in FIG. 19) parallel to the longitudinal axis L. The mounting envelope 734 has four substantially identical mounting sidewalls 738, each mounting sidewall 738 being generally perpendicular to the adjacent mounting sidewalls 738. Each mounting sidewall 738 is joined with the adjacent mounting sidewalls 738 by rounded mounting corners 740 having a corner surface 742 which correspond in shape and dimensions to the holder cylindrical wall 728 of the turret 720.

The mounting portion 636 has a generally cylindrical mounting through-bore 744 extending from the mounting front face 736 to the mounting rear face coaxially with the longitudinal axis L. Two spaced apart fixation threaded through-holes 746 extend between one of the mounting sidewalls 738 which constitutes a fixation sidewall 748 and the mounting through-bore 744 adjacent the mounting front face 736. Each fixation threaded through-hole 746 accommodates a threaded fixation screw (not shown).

The receiving portion 634 is of a generally cylindrical shape having a receiving peripheral envelope 750 extending coaxially with the longitudinal axis L between a receiving front end 752 and a receiving rear end 754. A receiving bore 642 having a generally cylindrical receiving surface 644 extends through the receiving portion 634 from the receiving front end 752 to the receiving rear end 754 coaxially with the longitudinal axis L. In the embodiment seen in FIG. 19, the receiving peripheral envelope 750 has four mutually perpendicular and peripherally spaced-apart flat fixation planes 756, extending parallel to the longitudinal axis L from a forward envelope portion 758 adjacent the receiving front end 752 to a rear envelope portion 760 adjacent the receiving rear end 754, formed thereon.

The receiving portion 634 is located in the mounting through-bore 744 with one fixation plane 756 facing the mounting threaded through-holes 746. When the threaded mounting screws (not shown) are tightened in the mounting threaded through-holes 746, a mounting screw end (not shown) of each mounting screw presses against the fixation plane 746 facing it, thus preventing the receiving portion 634 from turning relative to the mounting portion 636.

The receiving bore 642 accommodates a clamping mechanism 648 having a clamping sleeve 650, a plurality of rollers 652 and a cylindrical roller cage 654. The operation of the clamping mechanism 648 is substantially identical to the operation of clamping mechanisms 48, 248, and 448, and therefore will not be further elaborated upon herein below. When the clamping mechanism 648 is in a releasing position, the tool shank 632 can be freely inserted, positioned or released from a clamping through-hole 660 formed in the clamping sleeve 650 of the clamping mechanism 648 which is sized to facilitate such insertion or removal of the tool shank 632. When the clamping mechanism 648 is in a securing position, a plurality of rollers 652 disposed between a contoured clamping surface 676 of the clamping sleeve 650 and a cylindrical receiving surface 644 of the receiving bore 642 contract the clamping sleeve 650 radially inwardly, causing the clamping through-hole 630 to shrink and secure the tool shank 632 in the clamping sleeve 650.

When the rollers 652 contract the clamping sleeve 650 radially inwardly, they also expand the receiving portion 634 radially outwardly. Because the receiving portion 634 is accommodated in the mounting through-bore 744 of the mounting portion 636, the radially outward expansion of the receiving portion 634 forces also the mounting portion 636 to expand. As the mounting portion 636 is expanded, the rounded mounting corners 740 are urged radially outwardly against the holder cylindrical wall 728, so that one of the mounting sidewalls 738 is urged against the chuck support 730, to center and position the chuck 630 in the turret 720. Thus, transferring the clamping sleeve 650 from the releasing position to the securing position secures the tool shank 632 in the clamping sleeve 650, secures the clamping sleeve 650 in the receiving portion 634, secures the receiving portion 634 in the mounting portion 636, and secures and positions the mounting portion 636 of the chuck 630 in the turret 720.

In accordance with some embodiments of the present disclosure, the contoured clamping surface 676 has six identical clamping segments 682 (similar to clamping segments 82, but not shown in FIG. 19). Each clamping segment 682 is associated with a roller pair 698 having two identical rollers 652. Accordingly, the clamping mechanism 648 in this embodiment has six roller pairs 698.

In other possible embodiments of the disclosure, different chucks may have different clamping mechanisms with fewer clamping segments 682 for example 2, 3, 4, or 5 or with more clamping segments 682 for example 7, 8, 9, 10 or more and accordingly with few roller pairs 698 for example 2, 3, 4, or 5 or with more roller pairs 698 for example 7, 8, 9, 10 or more.

Other possible embodiments of the present invention may have different chucks with variations of the clamping mechanisms. For instance a clamping mechanism may have a single roller 652 associated with each clamping segment 682 or they may have identical first, second and third rollers 652', 652'', 652''' arranged in a roller trio 698 associated with each clamping segment 682. Other numbers of rollers are also possible.

Although the present disclosure has been described to a certain degree of particularity, it should be understood that alterations and modifications to the present disclosure may possibly be made without departing from the scope of the disclosure as hereinafter claimed.

What is claimed is:

1. A chuck for releasably securing an article comprising: a receiving portion comprising a receiving bore having a longitudinal axis (L) and a receiving bore surface; a clamping sleeve accommodated in the receiving bore and being rotatable between a releasing position and a securing position, the clamping sleeve comprising a contoured clamping surface having at least one clamping segment, the at least one clamping segment comprising a first ramp between a trough and a crest, and a second ramp between the crest and a depression, wherein the trough, crest and depression are respectively, at a trough distance $D_T$, a crest distance $D_C$ and a depression distance $D_D$, from the longitudinal axis (L), wherein $D_T < D_D < D_C$; and one or more rollers associated with said at least one clamping segment, the one or more rollers being accommodated between the receiving bore surface and the contoured clamping surface, wherein: when the clamping sleeve is in the securing position, a first roller of said one or more rollers is accommodated in the depression, and at least one of said one or more rollers applies a radially inwardly directed force against the contoured clamping surface; and when the clamping sleeve is in the releasing position, said first roller is not accommodated in the depression.

2. The chuck as in claim 1, wherein:
when the clamping sleeve is in the releasing position, the first roller is adjacent the trough.

3. The chuck as in claim 2, wherein:
when the clamping sleeve is rotated from the releasing position to the securing position, the first roller rides along the first ramp, passes over the crest and enters the depression.

4. The chuck as in claim 1, wherein:
the receiving bore and the clamping sleeve are both cylindrical.

5. The chuck as in claim 1, wherein:
said at least one of said one or more rollers applies a radially outwardly directed force against the receiving bore.

6. The chuck as in claim 1, wherein: the one or more rollers are cylindrical, each roller having a roller axis (R) that is parallel to the longitudinal axis (L).

7. The chuck as in claim 1, wherein the clamping segment is flanked by a preceding and a succeeding stop ridge, the stop ridge being a distance $D_S$ from the longitudinal axis (L), wherein $D_S \geqq D_C$.

8. The chuck as in claim 1, further comprising a cylindrical roller cage positioned between the receiving bore surface and the clamping sleeve, the cylindrical roller cage having at least one through-slot, the one or more rollers being accommodated in said through-slot.

9. The chuck as in claim 1, wherein:
there are six clamping segments; and
each clamping segment has associated therewith one or more rollers.

10. The chuck as in claim 9, wherein:
each clamping segment has two rollers associated therewith; and
when the clamping sleeve is in the securing position, the first of the two rollers is accommodated in the depression, and a second of the two rollers applies the radially inwardly directed force against the contoured clamping surface.

11. The chuck as in claim 9, wherein:
each clamping segment has three rollers associated therewith; and
when the clamping sleeve is in the securing position, the first of the three rollers is accommodated in the depression, and a second and a third of the three rollers both apply the radially inwardly directed force against the contoured clamping surface.

12. The chuck as in claim 1, wherein:
exactly one roller is associated with the at least one clamping segment; and
when the clamping sleeve is in the securing position, said one roller is accommodated in the depression and also applies the radially inwardly directed force against the contoured clamping surface.

13. The chuck as in claim 1, wherein a roller pair is associated with the at least one clamping segment.

14. The chuck as in claim 1 wherein a roller trio is associated with the at least one clamping segment.

15. The chuck as in claim 1, wherein the article is a rotary machining tool.

16. The chuck as in claim 1, further comprising:
a mounting portion having a mounting through bore formed therein, and further having an mounting envelope, and wherein:
the receiving portion is received into the mounting through bore of the mounting portion.

17. The chuck as in claim 16, wherein:
the receiving portion has an outer surface comprising a plurality of peripherally spaced apart fixation planes; and
the mounting envelope comprises a sidewall having a pair of threaded through-holes that extend to the mounting through bore.

18. The chuck as in claim 16, wherein:
when the clamping sleeve is in the securing position, the one or more rollers are adapted to urge the receiving portion to expand radially outwardly, thereby releasably securing the receiving portion in the mounting portion.

19. A machine tool turret comprising:
a plurality of chuck holders arranged in an array, each chuck holder retaining the chuck in accordance with claim 1.

20. A chuck for releasably securing an article comprising: a receiving portion comprising a receiving bore having a longitudinal axis (L) and a receiving bore surface; a clamping sleeve accommodated in the receiving bore and being rotatable between a releasing position and a securing position, the clamping sleeve comprising a contoured clamping surface having a plurality of clamping segments, each clamping segment comprising a first ramp between a trough and a crest, and a depression formed on a far side of the crest, wherein the trough, crest and depression are respectively, at a trough distance $D_T$, a crest distance $D_C$ and a depression distance $D_D$, from the longitudinal axis (L), wherein $D_T < D_D < D_C$; and one or more rollers associated with each clamping segment, the one or more rollers being accommodated between the receiving bore surface and the contoured clamping surface, wherein: when the clamping sleeve is in the securing position, a first roller of said one or more rollers is accommodated in the depression of a corresponding clamping segment, and at least one of said one or more rollers applies a radially inwardly directed force against the contoured clamping surface; when the clamping sleeve is in the releasing position, said first roller does not occupy the depression; and when the clamping sleeve is rotated from the releasing position to the securing position, the first roller rides along the first ramp, passes over the crest, and enters the depression.

* * * * *